(12) United States Patent
Raghunathan et al.

(10) Patent No.: US 10,978,880 B2
(45) Date of Patent: Apr. 13, 2021

(54) SYSTEM AND METHOD FOR CONTACTLESS POWER TRANSFER

(71) Applicant: GENERAL ELECTRIC COMPANY, Schenectady, NY (US)

(72) Inventors: Arun Kumar Raghunathan, Bangalore (IN); Somakumar Ramachandrapanicker, Karnataka (IN); Suma Memana Narayana Bhat, Karnataka (IN); Rijin Saseendran, Karnataka (IN); Adnan Kutubuddin Bohori, Karnataka (IN); Dinkar Agrawal, Karnataka (IN)

(73) Assignee: General Electric Company, Schenectady, NY (US)

( * ) Notice: Subject to any disclaimer, the term of this patent is extended or adjusted under 35 U.S.C. 154(b) by 367 days.

(21) Appl. No.: 14/878,554

(22) Filed: Oct. 8, 2015

(65) Prior Publication Data
US 2016/0105036 A1 Apr. 14, 2016

(30) Foreign Application Priority Data
Oct. 10, 2014 (IN) .......................... 5098/CHE/2014

(51) Int. Cl.
*H02J 50/12* (2016.01)
*H02J 5/00* (2016.01)
(Continued)

(52) U.S. Cl.
CPC .............. *H02J 5/005* (2013.01); *H01F 38/14* (2013.01); *H02J 7/025* (2013.01); *H02J 50/12* (2016.02);
(Continued)

(58) Field of Classification Search
CPC .. H02J 7/025; H02J 17/00; H02J 50/12; H02J 50/40; H02J 50/60; H02J 50/80;
(Continued)

(56) References Cited

U.S. PATENT DOCUMENTS

| 4,800,328 A | 1/1989 | Bolger et al. |
| 5,874,723 A | 2/1999 | Hasegawa et al. |

(Continued)

FOREIGN PATENT DOCUMENTS

| CN | 102005784 | 4/2011 |
| CN | 102195366 | 9/2011 |

(Continued)

OTHER PUBLICATIONS

Jinsung Choi et al., Design of high efficiency wireless charging pad based on magnetic resonance coupling, Microwave Conference (EuMC), 2012 42nd European, IEEE Xplore, Oct. 29, 2012-Nov. 1, 2012, pp. 916-919, Conference Location : Amsterdam.

(Continued)

*Primary Examiner* — Richard Isla
*Assistant Examiner* — Michael N DiBenedetto
(74) *Attorney, Agent, or Firm* — DeLizio Law, PLLC (57) ABSTRACT

A system including a primary coil assembly is provided. The primary coil assembly is configured to operate at a first resonant frequency having a first bandwidth; wherein a difference between the first resonant frequency and a system frequency is at least two times the first bandwidth, where the first resonant frequency is selected such that upon energizing the primary coil assembly at the system frequency, a primary current is induced in the primary coil assembly, which is at least ten times lesser than a system current.

20 Claims, 9 Drawing Sheets

(51) Int. Cl.
  *H02J 7/02*   (2016.01)
  *H01F 38/14*  (2006.01)
  *H02J 50/40*  (2016.01)
  *H02J 50/80*  (2016.01)
  *H02J 7/00*   (2006.01)

(52) U.S. Cl.
  CPC ............. *H02J 50/40* (2016.02); *H02J 50/80* (2016.02); *H02J 7/0042* (2013.01)

(58) Field of Classification Search
  CPC . H02J 50/00; H02J 50/10; H02J 5/005; H01F 38/14
  USPC .......................................... 320/108; 307/104
  See application file for complete search history.

(56) References Cited

U.S. PATENT DOCUMENTS

| | | | |
|---|---|---|---|
| 7,671,559 | B2 | 3/2010 | Ludtke |
| 8,049,370 | B2 | 11/2011 | Azancot et al. |
| 8,269,453 | B2 | 9/2012 | Ludtke |
| 8,456,038 | B2 | 6/2013 | Azancot et al. |
| 2011/0159812 | A1* | 6/2011 | Kim ............... H04B 5/0031 455/41.1 |
| 2011/0227420 | A1* | 9/2011 | Urano ............... H02J 17/00 307/104 |
| 2011/0234010 | A1 | 9/2011 | Bohori et al. |
| 2012/0049991 | A1 | 3/2012 | Baarman et al. |
| 2012/0217818 | A1* | 8/2012 | Yerazunis ............ H02J 5/005 307/104 |
| 2012/0223592 | A1* | 9/2012 | Kamata ............. H02J 17/00 307/104 |
| 2013/0002035 | A1* | 1/2013 | Oodachi ............ H04B 5/0037 307/104 |
| 2013/0015811 | A1 | 1/2013 | Tang et al. |
| 2013/0187596 | A1 | 7/2013 | Eastlack |
| 2013/0196183 | A1 | 8/2013 | Ludtke |
| 2013/0241478 | A1 | 9/2013 | Azancot et al. |
| 2015/0076921 | A1* | 3/2015 | Park ................... H02J 50/12 307/104 |

FOREIGN PATENT DOCUMENTS

| | | |
|---|---|---|
| CN | 102570128 A | 7/2012 |
| CN | 103168405 | 6/2013 |
| EP | 2367263 A2 | 9/2011 |
| EP | 2369711 A2 | 9/2011 |
| GB | 2505278 A | 2/2014 |
| JP | 2009106136 | 5/2009 |
| JP | 2011205886 | 10/2011 |
| JP | 2012178916 | 9/2012 |
| JP | 2012182981 | 9/2012 |
| JP | 2012191134 | 10/2012 |
| JP | 2013188071 | 3/2013 |
| WO | 2012092183 A2 | 7/2012 |
| WO | 2013164831 A1 | 11/2013 |

OTHER PUBLICATIONS

Kohara, H. et al., Basic characteristics of selective wireless power transfer system based on coupled magnetic resonances, Microwave Conference Proceedings (APMC), 2012 Asia-Pacific, IEEE Xplore, Dec. 4-7, 2012, pp. 298-300, Conference Location : Kaohsiung.
European Search Report and Opinion issued in connection with corresponding EP Application No. 15188811.2 dated Feb. 10, 2016.
"Chinese Application No. 201510647562 Second Office Action", dated Sep. 29, 2019, 12 pages.
"India Application No. 5098/CHE/2014 Examination Report", dated Mar. 18, 2019, 9 pages.
"Japanese Application No. 2015-197285 Notification of Reason for Refusal", dated Jul. 26, 2019, 6 pages.
"Chinese Application No. 201510647562 First Office Action", dated Jan. 24, 2019, 10 pages.
"European Application No. 15188811.2 Communication pursuant to Article 94(3) EPC", dated Oct. 9, 2018, 5 pages.
"European Application No. 15188811.2 Communication pursuant to Article 94(3) EPC", dated Nov. 20, 2017, 4 pages.
"European Application No. 15188811.2 Communication pursuant to Article 94(3) EPC", dated Apr. 20, 2017, 4 pages.
"European Application No. 15188811.2 Communication pursuant to Article 94(3) EPC", dated Jun. 7, 2019, 5 pages.
"Qi System Description Wireless Power Transfer", Wireless Power Consortium, vol. 1:Low Power, Part 1:Interface Definition, Version 1.0.1, Oct. 2010, 88 pages.
"European Application No. 15188811.2 Communication pursuant to Article 94(3) EPC", dated Jul. 17, 2020, 5 pages.
"Brazilian Application No. 102015025127-0 Search Report", dated May 19, 2020 , 4 pages.
"Chinese Application No. 201510647562 Search Report", dated Jan. 16, 2019 , 2 pages.
"Chinese Application No. 201510647562 Third Office Action", dated Apr. 1, 2020 , 5 pages.
"Japanese Application No. 2015-197285 Decision of Refusal", dated Dec. 4, 2019, 3 pages.

\* cited by examiner

SYSTEM AND METHOD FOR CONTACTLESS POWER TRANSFER

BACKGROUND

Embodiments of the invention generally relate to power transfer systems and, more particularly, to contactless power transfer systems.

Power transfer systems are employed for transmitting power from one object to another. Based on a method of transmitting power, the power transfer systems can be classified into power transfer systems using physical connections between a transmitter and a receiver for transmitting power and contactless power transfer systems in which there is no physical connection between the transmitter and the receiver. The contactless power transfer systems employ various methods for transmitting power wirelessly. One such approach includes a resonator based contactless power transfer system.

The resonator based contactless power transfer systems are used in various applications such as electric vehicle charging and wireless mobile charging. However, the configuration and operation of the resonator based contactless power transfer systems may differ based on the application in which the resonator based contactless power transfer systems are employed. One such application may include a resonator based contactless power transfer system to provide power to household electrical devices such as mobile phones, tablets, and laptops.

In such a configuration, the resonator based contactless power transfer system includes a source coil that receives power from a power source and transmits the power to load coils provided in the household electrical devices. Such a configuration of the resonator based contactless power transfer systems may be operated in two ways. In a first instance, the source coil may be switched to an operating state manually every time prior to initiating charging of the household electrical device or in a second instance, the source coil may be maintained in the operating state continuously with or without the requirement of charging of the household electrical device. However, operating the source coil in the first instance requires additional manual effort and operating the source coil in the second instance leads to undesirable electromagnetic interferences in nearby areas which may lead to safety and health issues.

Hence, there is a need for an improved system to address the aforementioned issues.

BRIEF DESCRIPTION

Briefly, in accordance with one embodiment, a system including a primary coil assembly is provided. The primary coil assembly is configured to operate at a first resonant frequency having a first bandwidth; wherein a difference between the first resonant frequency and a system frequency is at least two times the first bandwidth, where the first resonant frequency is selected such that upon energizing the primary coil assembly at the system frequency, a primary current is induced in the primary coil assembly, which is at least ten times lesser than a system current.

In accordance with another embodiment, a wireless charging system is provided. The wireless charging system includes a power source configured to operate at a system frequency. The wireless charging system also includes a wireless charging device operatively coupled to the power source, where the wireless charging device includes one or more resonator coils configured to operate at a first resonant frequency and having a first bandwidth; wherein a difference between the first resonant frequency and a system frequency is at least two times the first bandwidth. Furthermore, the first resonant frequency is selected such that upon energizing the one or more resonator coils by the power source at the system frequency, a primary current is induced in the one or more resonator coils, which is at least ten times lesser than a system current. The wireless charging system further includes one or more electrical devices including one or more load coils operatively coupled to a load in respective electrical devices, where upon magnetically coupling the one or more load coils to the one or more resonator coils, the system current is induced in the one or more resonator coils to enable exchange of power between the one or more load coils and the one or more resonator coils.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a system for contactless power transfer. The system includes a primary coil assembly configured to operate at a first resonant frequency having a first bandwidth; wherein a difference between the first resonant frequency and a system frequency is at least two times the first bandwidth, where the first resonant frequency is selected such that upon energizing the primary coil assembly at the system frequency, a primary current is induced in the primary coil assembly, which is at least ten times lesser than a system current. In one embodiment, the system includes a wireless charging system. The wireless charging system includes a power source, a wireless charging device, and one or more electrical devices.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. Specifically, unless indicated otherwise, the term "coupled" includes resonance coupling that is defined as a coupling between two or more resonators such that they are able to exchange power when excited at a particular frequency. The terms "exchange" and "transfer" may be used interchangeably in the specification and convey the same meaning.

Figure 1:
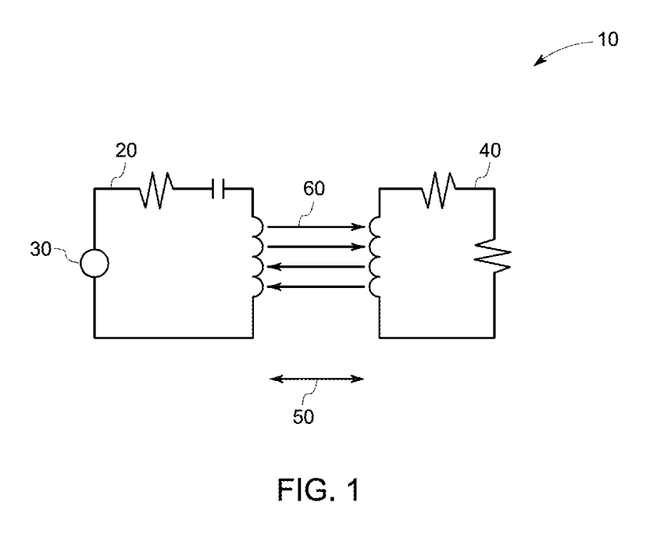
FIG. 1 is a schematic representation of a wireless charging module in accordance with an embodiment of the invention.

FIG. 1 is a schematic representation of a system 10 for contactless power transfer in accordance with an embodiment of the invention. The system 10 includes a primary coil assembly 20 configured to operate at a first resonant frequency having a first bandwidth. The primary coil assembly 20 is designed such that a difference between the first resonant frequency and a system frequency is at least two times the first bandwidth. In one embodiment, the system frequency includes a frequency of a power source 30 operatively coupled to the primary coil assembly 20. Furthermore, the power source 30 is used to energize the primary coil assembly 20 at the system frequency and upon energizing the primary coil assembly 20, a primary current is induced within the primary coil assembly 20.

The system 10 further includes a load coil 40 that may be magnetically coupled to the primary coil assembly 20. The load coil 40 is placed within a predetermined distance 50 from the primary coil assembly 20 to magnetically couple to the primary coil assembly 20 to the load coil 40. Due to the magnetic coupling between the primary coil assembly 20 and the load coil 40, a system current is induced within the primary coil assembly 20 and the load coil 40. As used herein, the term "system current" may be defined as a current provided by the power source 30. The primary coil assembly 20 draws the system current from the power source 30 at the system frequency and transfers the system current to the load coil 40 via a magnetic field 60.

Furthermore, in situations, where the load coil 40 is not placed within the predetermined distance 50 from the primary coil assembly 20 and the primary coil assembly 20 is energized by the power source, the primary current in the primary coil assembly 20 is at least ten times lesser than the system current which leads to lower electromagnetic interferences. Further details of selecting the first resonant frequency of the primary coil assembly 20 are discussed with respect to FIG. 2.

Figure 2:
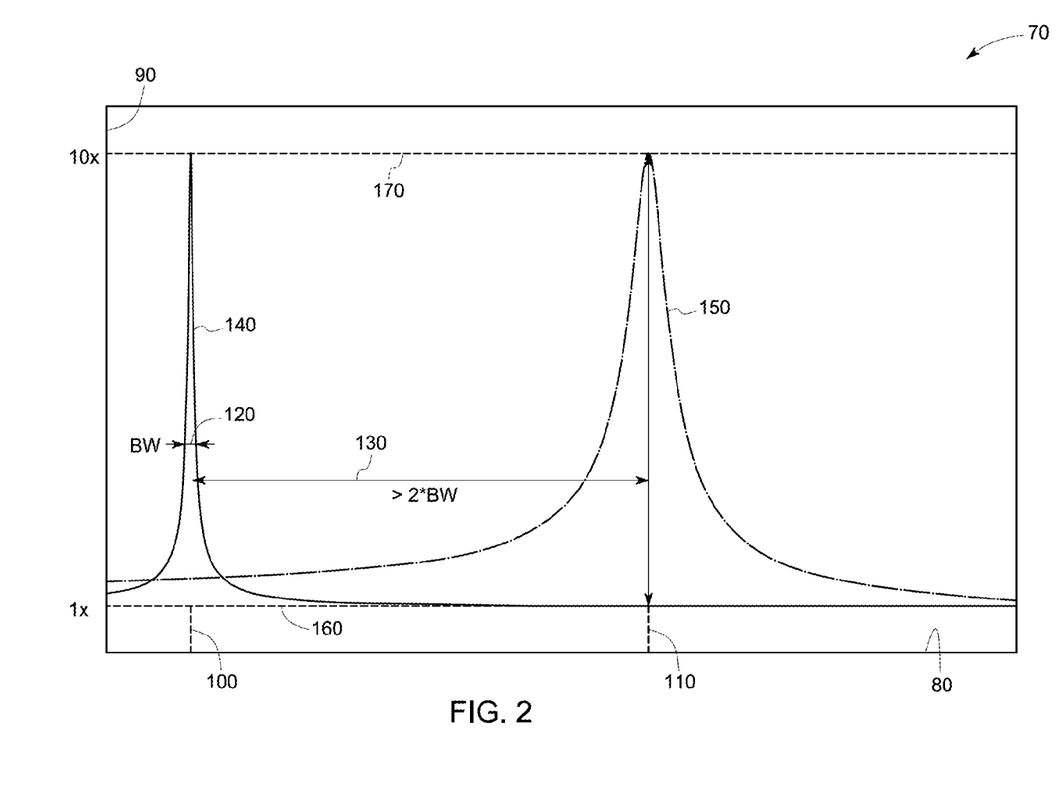
FIG. 2 is a schematic representation of a contactless power transfer system including the wireless charging module of FIG. 1 and one or more load coils operatively coupled to one or more electrical devices in accordance with an embodiment of the invention.

FIG. 2 is an exemplary graphical representation 70 depicting a first resonant frequency and a system frequency with respect to current induced in the primary coil assembly of FIG. 1 in accordance with an embodiment of the invention. X-axis 80 depicts frequency. Y-axis 90 represents current. Point 100 represents the first resonant frequency. Point 110 represents the system frequency. Arrows 120 represent the first bandwidth. Arrow 130 represents the difference between the first resonant frequency and the system frequency. Curve 140 represents a current drawn by the primary coil assembly when the load coil is placed outside the predetermined distance from the primary coil assembly. Curve 150 represents a current drawn by the primary coil assembly when the load coil is placed within the predetermined distance from the primary coil assembly. Line 160 represents the primary current and line 170 represents the system current. As shown, the difference 130 between the first resonant frequency 100 and the system frequency 110 is at least two times the first bandwidth 120. Moreover, the primary current 160 in the primary coil assembly at the system frequency 110 is ten times lesser than the system current 170 when the load coil is not placed within the predetermined distance. Similarly, as shown, the system current 170 at the system frequency 110 in the condition where the load coil is placed within the predetermined distance is ten times higher than the primary current 160 at the system frequency 110. Therefore, the first resonant frequency 100 is selected such that upon energizing the primary coil assembly at system frequency 110 without the load coil induces the primary current 160 which is at least ten times lesser than the system current 170, which is induced when the load coil is placed within the predetermined distance at the system frequency 110.

FIG. 2 is a schematic representation of a wireless charging system 200 in accordance with an embodiment of the invention. The wireless charging system 200 includes a primary coil assembly 210 disposed on a housing 220. In one embodiment, the primary coil assembly 210 includes a wireless charging device. The primary coil assembly 210 includes a first layer of one or more resonator coils and a second layer of one or more resonator coils. The first layer includes a primary coil 230 operatively coupled to a power source 240. The second layer includes a plurality of resonator coils 250 magnetically coupled to the primary coil 230 and disposed on top of the primary coil 230. The primary coil 230 and the plurality of resonator coils 250 are energized at a system frequency using the power source 240 and a primary current is induced in the primary coil 230 and the plurality of resonator coils 250. In one embodiment, the primary current includes a near zero current. In a specific embodiment, the near zero current may include a current less than one ampere.

Subsequently, one or more electrical devices 260, 270 are placed in proximity of the plurality of resonator coils 250 such that the one or more load coils 280, 290 operatively coupled to the one or more electrical devices 260, 270 are within a predetermined distance of one or more sets of resonator coils 265, 275. In one embodiment, each set 285, 295 may include one or more resonator coils. The present embodiment includes a first electrical device 260 further including a first load coil 280 and a second electrical device 270 further including a second load coil 290. The first electrical device 260 is placed in proximity with a first set of resonator coils 265 and the second electrical device 270 is placed in proximity with a second set of resonator coils 275. In one embodiment each of the first load coil 280 and the second load coil 290 include a magnetic material coating that induces a change in the first resonant frequency of the first set of resonator coils 265 and the second set of resonator coils 275 respectively. Such change in the first resonant frequency increases the primary current from near zero to a load current (system current of FIG. 1). The magnetic coupling of the first set of resonator coils 265 and the second set of resonator coils 275 with the primary coil 230 enable the first load coil 280 and the second load coil 290 to exchange power with the primary coil 230 simultaneously and independently via the first set of resonator coils 265 and the second set of resonator coils 275 respectively. In one embodiment, the first set of resonator coils 265 and the second set of resonator coils 275 may enable bi-directional exchange of power and data between the first set of resonator coils 265 and the first load coil 280 and the second set of resonator coils 275 and the second load coil 290.

Figure 3:
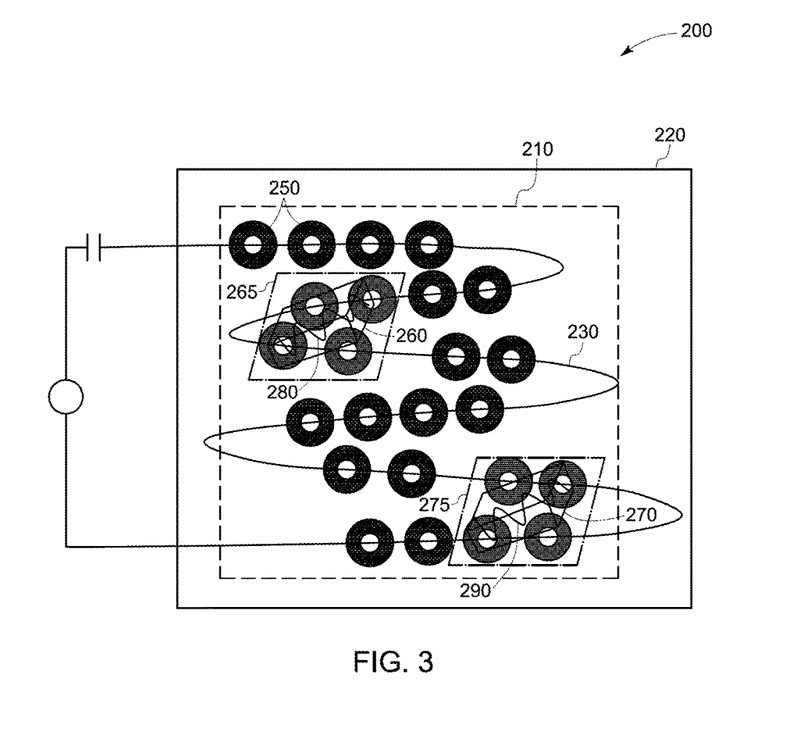
FIG. 3 is a schematic representation of another configuration of the wireless charging module of FIG. 2 in accordance with an embodiment of the invention.
Figure 4:
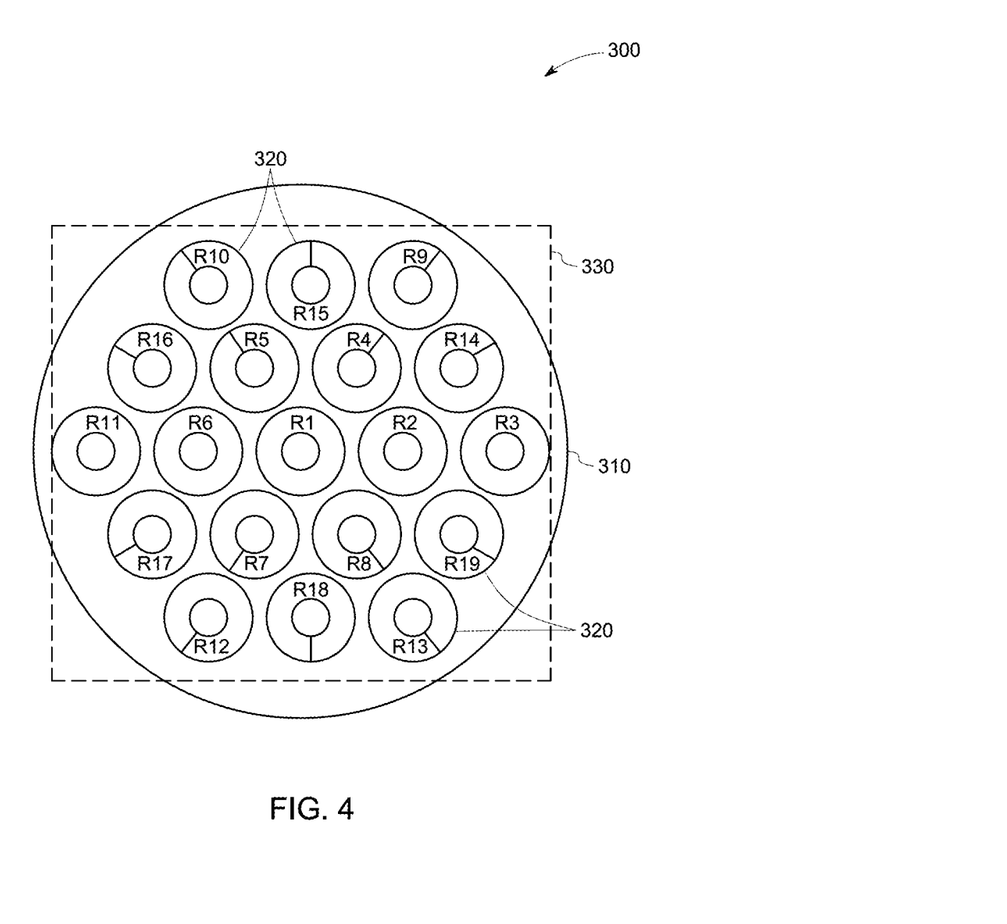
FIG. 4 is a schematic representation of an exemplary current pattern in resonators R1-R19 of the wireless charging module of FIG. 3 upon placing a load coil on the wireless charging module in accordance with an embodiment of the invention.

FIG. 4 is a schematic representation of another configuration 300 of the wireless charging system 200 of FIG. 3 in accordance with an embodiment of the invention. This configuration 300 of the wireless charging system may include a first layer of resonator coils including a primary coil 310 and a second layer of resonator coils including a plurality of resonator coils 320 disposed above the primary coil 310. In this embodiment, the second layer of resonator coils includes an array 330 of nineteen resonator coils (R1-R19) magnetically coupled to the primary coil 310. Each of the plurality of resonator coils 320 may be excited by the same primary coil 310. Detailed operations of this embodiment are discussed later with respect to FIG. 5.

Figure 5:
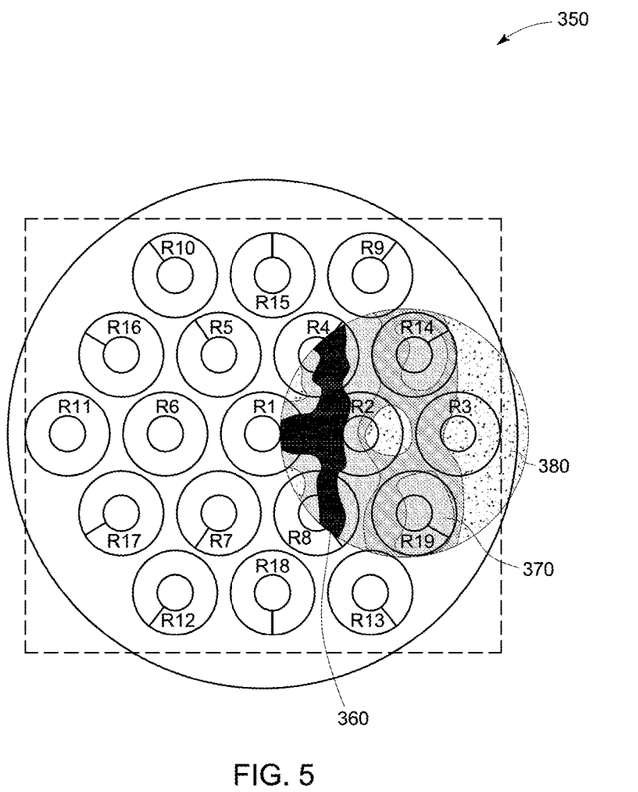
FIG. 5 is a schematic representation of another embodiment of a contactless power transfer system in accordance with an embodiment of the invention.

FIG. 5 is a schematic representation of an exemplary current pattern 350 in resonator coils R1-4, R8, R14 and R19 of the wireless charging system 300 of FIG. 3 upon placing a load coil (FIG. 3) on the wireless charging system in accordance with an embodiment of the invention. In this embodiment, the load coil (FIG. 3) is placed on the wireless charging system such that resonator coils R1-4, R8, R14 and R19 fall within the predetermined distance and a system current (FIG. 1) is induced in the resonator coils R1-4, R8, R14 and R19. The magnetic coupling between the resonator coils R1-4, R8, R14 and R19, the primary coil 310 and the load coil enables an exchange of power between the primary coil and the load coil via the resonator coils R1-4, R8, R14 and R19. However, intensity of system current flowing via each resonator coil may be different based on a portion of the load coil placed above each resonator coil. In this embodiment, resonator coils R1, R4, and R8 may represent a highest intensity of current, shown by section 360, flowing from the primary coil (FIG. 3) to the load coil. Similarly, resonators R14, R2, and R19 depict a moderate intensity of current, shown by section 370, flowing from the primary coil to the load coil and resonator R3 represents least intensity of current shown by section 380. Furthermore, the remaining resonator coils in the array 330 (FIG. 4) include the primary current which is at least ten times lesser than the system current.

Figure 6:
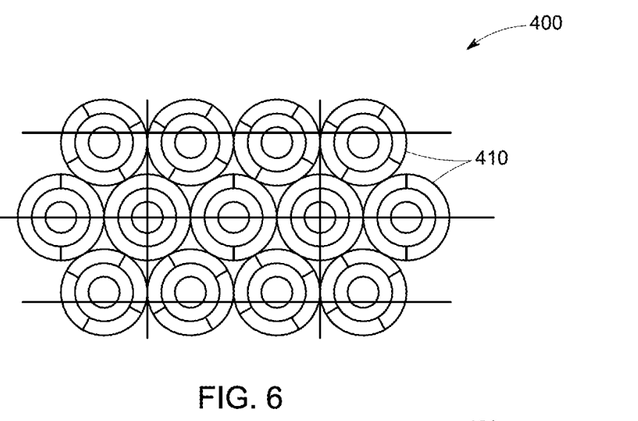
FIG. 6 is a schematic representation of an exemplary current pattern in resonators R1-R19 of the wireless charging module of FIG. 5 upon placing a load coil in proximity to the wireless charging module in accordance with an embodiment of the invention.

FIG. 6 is a schematic representation of another configuration 400 of the wireless charging system 200 of FIG. 3 in accordance with an embodiment of the invention. This configuration 400 of the wireless charging system may include only one layer of resonator coils 410 arranged in a hexagonal array and operatively coupled to a power source. In one embodiment, each of the resonator coils 410 is operatively coupled to the power source in parallel. Each of the resonator coils include a primary current at the system frequency and upon magnetically coupling one or more load coils to one or more resonator coils, the resonator coils within the predetermined distance from the one or more load coils induce a system current and enable an exchange of power as discussed in FIG. 3-5. In one embodiment, the configuration 400 may also be arranged in a quadrature array.

Figure 7:
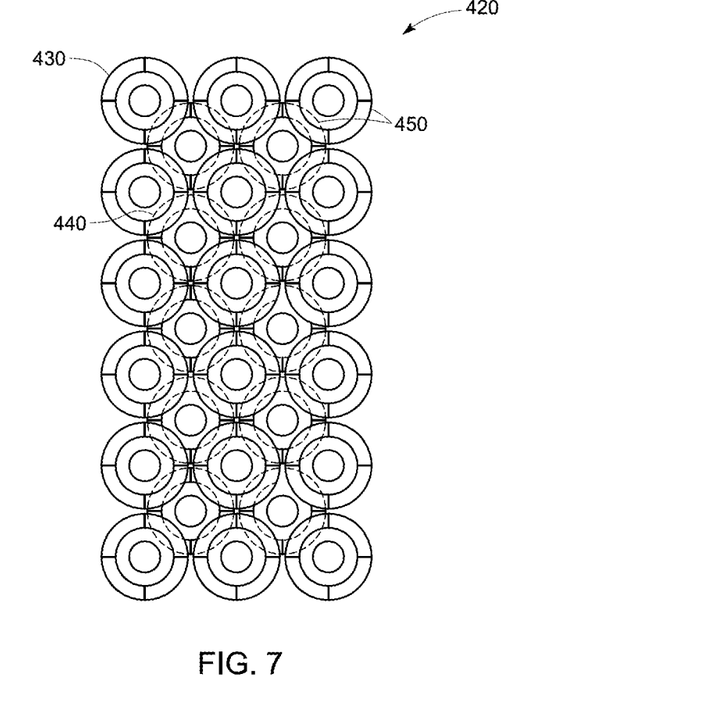
FIG. 7 is a schematic representation of a two layer quadrature array configuration of the wireless charging system of FIG. 3 in accordance with an embodiment of the invention.

FIG. 7 is a schematic representation of a two layer quadrature array configuration 420 of the wireless charging system 200 of FIG. 3 in accordance with an embodiment of the invention. This configuration 420 includes two layers 430, 440 of resonator coils 450 arranged in a quadrature array. The first layer 430 is formed by arranging the resonator coils 450 in the quadrature array. Furthermore, a second layer 440 of the resonator coils 450 is disposed on top of the first layer 430 in a displaced manner such that there is no void between the first layer 430 and the second layer 440.

Figure 8:
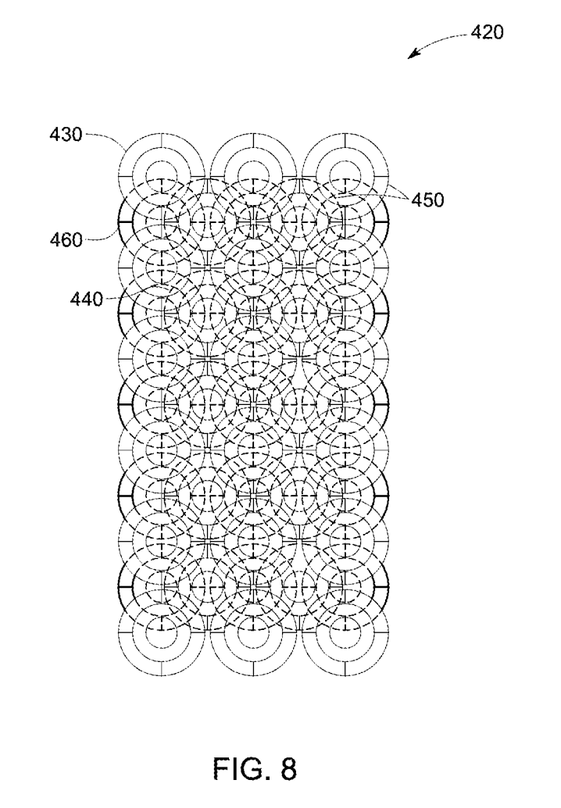
FIG. 8 is a schematic representation of a three layer quadrature array configuration of the wireless charging system of FIG. 3 in accordance with an embodiment of the invention.

FIG. 8 is a schematic representation of a three layer quadrature array configuration 460 of the wireless charging system 200 of FIG. 3 in accordance with an embodiment of the invention. In this configuration, a third layer 460 is disposed on top of the second layer 440 of FIG. 7 to form the quadrature array. The third layer 460 is disposed on top of the second layer 440 in a displaced manner such that there is no void between the first layer 430, the second layer 440, and the third layer 460.

Figure 9:
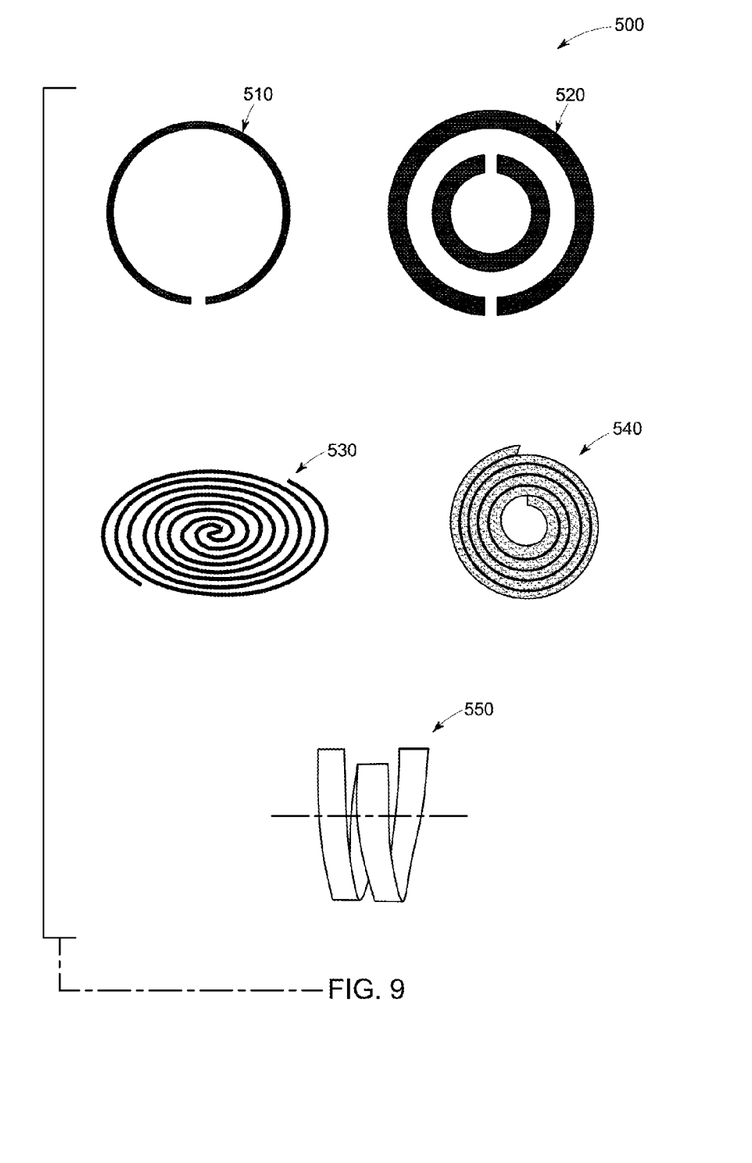
FIG. 9 depicts various structures of the resonators that may form the array in accordance with an embodiment of the invention.

FIG. 9 depicts various structures 500 of the resonator coils that may form the primary coil assembly in accordance with an embodiment of the invention. In one embodiment, the plurality of resonator coils may include a single loop coil 510. In another embodiment, the plurality of resonator coils may include multiple turns such as in a split ring structure 520, spiral structure 530, Swiss-roll structure 540, or helical coil 550. Selection of a structure for a particular application is determined by the size of the array and self-resonating frequency of the plurality of resonators.

Figure 10:
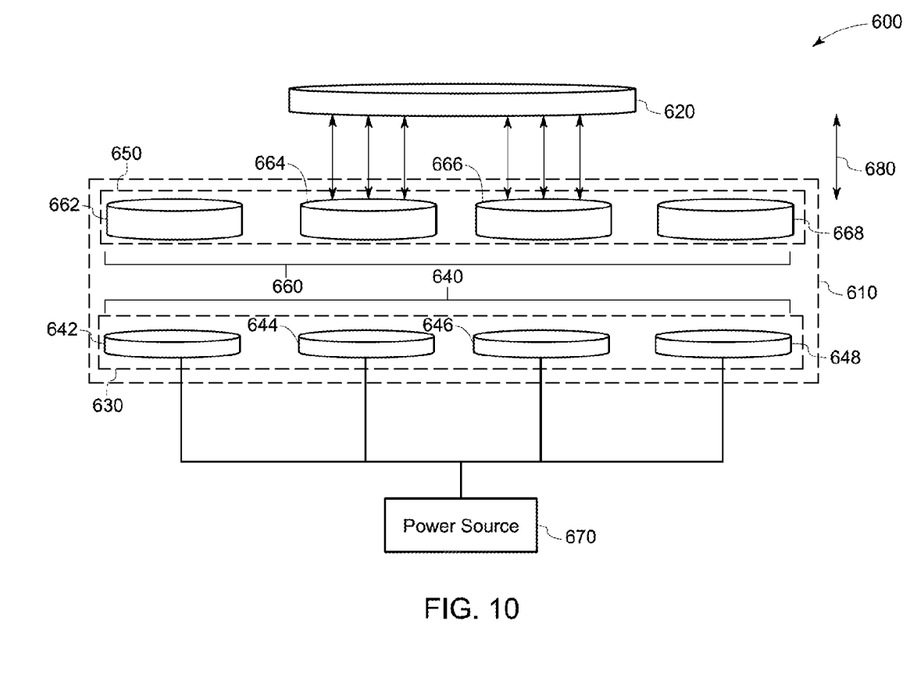
FIG. 10 is a schematic representation of an exemplary furniture module including a wireless charging module in accordance with an embodiment of the invention.

FIG. 10 is a schematic representation of another embodiment 600 of a wireless charging system of FIG. 3 in accordance with an embodiment of the invention. In this embodiment, the wireless charging system 600 includes a wireless charging device 610 and one or more load coils 620. The wireless charging device 610 further includes a first layer 630 including a first set 640 of resonator coils and a second layer 650 including a second set 660 of resonator coils. The second set 660 of resonator coils is disposed above the first set 640 of resonator coils such that each resonator coil in the first set 640 corresponds to a resonator coil in the second set 660. For example, the wireless charging system 600 includes four resonator coils represented by reference numerals 642, 644, 646, 648 forming the first set 640. Each of the four resonator coils 642, 644, 646, 648 may be individually coupled to four corresponding resonator coils represented by reference numerals 662, 664, 666, 668 forming the second set 660. Each of the four coils 642, 644, 646, 648 are operatively coupled to a power source 670. For illustration purposes, only one load coil 620 is represented, however multiple load coils may also be used to simultaneously exchange power with the one or more resonator coils as disclosed in FIG. 3. In one embodiment, the one or more resonator coils in the second set 660 may form one or more sets of resonator coils and each set of resonator coils in the second layer 650 may be magnetically coupled to a corresponding resonator coil in the first set 640.

During operation, upon placing the load coil 620 in proximity of the second set 660 of resonator coils such as resonator coils 664, 666, a system current is induced in the resonator coils 664, 666 and the corresponding resonator coils 644, 646 in the first set 640. In one embodiment, a change in the current of those corresponding resonators 664, 666 is observed, which are placed within a predetermined distance 680 of the load coil 620. Such a change in the current of the corresponding resonators 664, 666 induces a change in the current of the corresponding resonator coils 644, 646 of the first set 640. The current in the resonator coils 644, 646, 664, 666 increases from a primary current (FIG. 1-2) to a system current which is at least ten times higher than the primary current. Such a change in current in the resonator coils 644, 646, 664, 666 enables exchange of power between the one or more resonator coils 644, 646, 664, 666 in the wireless charging device and the load coil 620.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system comprising:
a primary coil assembly configured to operate at a first resonant frequency having a first bandwidth; wherein a difference between the first resonant frequency and a system frequency is at least two times the first bandwidth, the system frequency comprising a frequency of a power source operatively coupled to the primary coil assembly; and
wherein the first resonant frequency is selected such that upon energizing the primary coil assembly at the system frequency, a primary current is induced in the primary coil assembly, which is at least ten times lesser than a system current, the system current comprising a current provided by the power source operatively coupled to the primary coil assembly.

2. The system of claim 1, further comprising a load coil and wherein the system current comprises a current drawn by the primary coil assembly upon magnetically coupling the load coil to the primary coil assembly.

3. The system of claim 1, wherein the primary coil assembly comprises one or more resonator coils and the system further includes one or more electrical devices including one or more load coils, the one or more load coils including a magnetic material configured to induce a change in the resonant frequency of the one or more resonator coils.

4. The system of claim 3, wherein the primary coil assembly comprises one or more layers of the resonator coils.

5. The system of claim 3, wherein the one or more load coils are magnetically coupled to the one or more resonator coils to enable exchange of power between the one or more resonator coils and the one or more load coils.

6. The system of claim 5, wherein the one or more resonator coils within a predetermined distance of the one or more load coils in the primary coil assembly operates at the system current to enable exchange of power between the one or more resonator coils and the one or more load coils.

7. The system of claim 3, wherein the one or more resonator coils enable simultaneous exchange of power and data between the one or more resonator coils and the one or more load coils.

8. The system of claim 7, wherein the one or more resonator coils enable bi-directional exchange of power and data between the one or more resonator coils and the one or more load coils.

9. The system of claim 1, wherein the primary coil assembly comprises a wireless charging device.

10. A wireless charging system comprising:
a power source configured to operate at a system frequency;
a wireless charging device operatively coupled to the power source comprising:
one or more resonator coils configured to operate at a first resonant frequency and having a first bandwidth; wherein a difference between the first resonant frequency and a system frequency is at least two times the first bandwidth,
wherein the first resonant frequency is selected such that upon energizing the one or more resonator coils by the power source at the system frequency, a primary current is induced in the one or more resonator coils, which is at least ten times lesser than a system current, the system current comprising a current provided by the power source, and
one or more electrical devices comprising:
one or more load coils operatively coupled to a load in respective electrical devices, the one or more load coils including a magnetic material configured to induce a change in the resonant frequency of the one or more resonator coils,
wherein upon magnetically coupling the one or more load coils to the one or more resonator coils, the system current is induced in the one or more resonator coils to enable exchange of power between the one or more load coils and the one or more resonator coils.

11. The system of claim 10, wherein the one or more resonator coils within a predetermined distance of the one or more load coils operates at the system current to enable exchange of power between the one or more resonator coils and the one or more load coils.

12. The system of claim 10, wherein the one or more resonator coils enable simultaneous exchange of power and data between the one or more resonator coils and the one or more load coils.

13. The system of claim 10, wherein the one or more resonator coils enable bi-directional exchange of power and data between the one or more resonator coils and the one or more load coils.

14. The system of claim 10, wherein the one or more resonator coils are arranged in one or more layers of resonator coils.

15. The system of claim 14, wherein one resonator coil forms a first layer and operates as a primary coil and a plurality of resonator coils form a second layer disposed on top of the primary coil.

16. The system of claim 15, wherein the primary coil is operatively coupled to the power source and the one or more resonator coils are magnetically coupled to the primary coil.

17. The system of claim 14, wherein a first set of resonator coils form a first layer and a second set of resonator coils form a second layer, wherein the second layer is disposed on top of the first layer, wherein each of the resonator coils in the first set is magnetically coupled to a corresponding resonator coil in the second set.

18. The system of claim 17, wherein each of the resonators in the first set is operatively coupled to the power source in a parallel configuration and upon magnetically coupling the one or more load coils to the one or more resonator coils in the second set enables exchange of power between the corresponding resonator coils in the first set and the one or more load coils at the system current.

19. A system comprising:
   a power source configured to provide a system current at a system frequency; and
   a primary coil assembly operatively coupled to the power source and configured to produce a primary current at a primary resonant frequency when the primary coil assembly is energized by the power source,
   wherein the primary current is at least ten times less than the system current, and
   wherein a difference between the primary resonant frequency and the system frequency is at least two times a first bandwidth of the primary resonant frequency.

20. The system of claim 19, wherein the primary coil assembly comprises one or more resonator coils and the system further includes one or more electrical devices including one or more load coils, the one or more load coils including a magnetic material configured to induce a change in the primary resonant frequency of the one or more resonator coils.

* * * * *